(12) United States Patent
Shawbitz

(10) Patent No.: US 10,436,380 B1
(45) Date of Patent: Oct. 8, 2019

(54) COLLAPSIBLE HANGER AND ADAPTER COMBINATION APPARATUS AND METHOD

(71) Applicant: Michael Louis Shawbitz, Mary Esther, FL (US)

(72) Inventor: Michael Louis Shawbitz, Mary Esther, FL (US)

( * ) Notice: Subject to any disclaimer, the term of this patent is extended or adjusted under 35 U.S.C. 154(b) by 188 days.

(21) Appl. No.: 15/424,280

(22) Filed: Feb. 3, 2017

Related U.S. Application Data

(60) Provisional application No. 62/290,503, filed on Feb. 3, 2016.

(51) Int. Cl.
*A47H 1/10* (2006.01)
*F16M 13/02* (2006.01)
*B25J 1/04* (2006.01)

(52) U.S. Cl.
CPC ............... *F16M 13/02* (2013.01); *B25J 1/04* (2013.01)

(58) Field of Classification Search
CPC .... A47F 5/0861; A47F 5/0823; B65D 5/4208
See application file for complete search history.

(56) References Cited

U.S. PATENT DOCUMENTS

| | | | | |
|---|---|---|---|---|
| 4,140,218 A | * | 2/1979 | Forte | B65D 5/4208 206/303 |
| 5,499,723 A | * | 3/1996 | Morrow | A47F 5/0823 211/59.1 |
| 7,484,628 B2 | * | 2/2009 | Schneider | A47F 5/0861 211/47 |

* cited by examiner

*Primary Examiner* — Amy J. Sterling
(74) *Attorney, Agent, or Firm* — J. Nevin Shaffer, Jr.

(57) ABSTRACT

A collapsible hanger and adapter combination apparatus consisting of a single piece of material configured when folded to form a hanger including a top with an adapter receiving section and an object connection section connected with the top. An adapter is configured for selective insertion and removal from the adapter receiving section where the adapter includes a tapered front and a top and a bottom. A means for removably connecting the top of the hanger with a surface is provided as well as a means for removably connecting the top of the adapter with the hanger when the tapered front of the adapter is inserted into the adapter receiving section.

20 Claims, 5 Drawing Sheets

COLLAPSIBLE HANGER AND ADAPTER COMBINATION APPARATUS AND METHOD

CROSS REFERENCE TO RELATED APPLICATION

This application claims the benefit of previously filed U.S. provisional patent application No. 62/290,503 filed Feb. 3, 2016 for a "Collapsible Hanger and Adapter Combination Apparatus and Method". The Applicant hereby claims the benefit of this provisional application under 35 U.S.C. § 119. The entire content of this provisional application is incorporated herein by this reference.

FIELD OF THE INVENTION

This invention relates to an improved hanger device. In particular, in accordance with one embodiment, the invention relates to a collapsible hanger and adapter combination apparatus consisting of a single piece of material configured when folded to form a hanger including a top with an adapter receiving section and an object connection section connected with the top. An adapter is configured for selective insertion and removal from the adapter receiving section where the adapter includes a tapered front and a top and a bottom. A means for removably connecting the top of the hanger with a surface is provided as well as a means for removably connecting the top of the adapter with the hanger when the tapered front of the adapter is inserted into the adapter receiving section.

BACKGROUND OF THE INVENTION

A problem exists with regard to hanging objects. In particular, by way of example only and not by limitation, hanging decorations from ceilings is an activity fraught with hidden danger and difficulties. Ladders are unstable and decorations often need to be adjusted after first placement which requires additional use of ladders and extra time, energy and money.

Thus, there is a need in the art for an easy to use hanger system for hanging objects, such as decorations for example only, including a means for placing and replacing the hanger system that does not require the use of ladders, among other things.

It therefore is an object of this invention to provide a hanger system for hanging objects that is inexpensive to create, that is easy to use, that is simple to locate and that facilitates replacement and repositioning of previously placed objects.

SUMMARY OF THE INVENTION

Accordingly, the improved collapsible hanger and adapter combination apparatus and method of the present invention, according to one embodiment, includes a single piece of material configured when folded to form a hanger including a top with an adapter receiving section and an object connection section connected with the top. An adapter is configured for selective insertion and removal from the adapter receiving section where the adapter includes a tapered front and a top and a bottom. A means for removably connecting the top of the hanger with a surface is provided as well as a means for removably connecting the top of the adapter with the hanger when the tapered front of the adapter is inserted into the adapter receiving section.

All terms used herein are given their common meaning so that "collapsible" identifies and describes a material that once formed is capable of returning to its preformed state. As described more fully hereafter, the present invention is formed from a single, flat piece of material as clearly illustrated in the figures. "Object" describes anything that a user wants to hang from the present invention such as signs, decorations, or the like.

According to another aspect of the invention, the apparatus further includes a wand/handle connected to the adapter where the wand has a length with a first end and a second end where the first end is connected to the adapter and where the second end is a handle.

In one aspect, the handle includes nested sections such that the handle is extendable and retractable.

In a further aspect, the means for removably connecting the top of the hanger with a surface is selected from a group consisting of: magnets and glue dots.

In one aspect, the means for removably connecting the top of the adapter with the hanger when the adapter is inserted into the adapter receiving section is selected from a group consisting of: metal, magnets and glue dots.

In another aspect, the object connection section includes more than one cutout for retaining object hanging material.

In a further aspect the hanger further consists of: a hanger with a length with a first edge and a second edge where the first edge and the second edge are separated by the width, the hanger with a first side and a second side and a center halfway along the length and between the width. A top fold in the hanger where the top fold includes a pair of top fold lines equidistant from the center with one top fold line on either side of the center. A limb fold in the hanger where the limb fold includes a pair of limb fold lines equidistant from the top fold lines such that each limb fold line is equidistant from the center and equidistant from one of the top fold lines. A connection tab in the hanger at one of the limb fold lines and a connection slot at the other limb fold line where the connection slot is conformed to receive the connection tab. A connection tab securing slot in the hanger where the connection tab securing slot is conformed to receive and retain the connection tab after the connection tab is received by the connection slot. An eyelet tab in the hanger where the eyelet tab is partially extendable from the hanger. A pair of first receiving notches in the first edge of the hanger where the first receiving notches are equidistant from the center. A pair of second receiving notches in the second edge of the hanger where the second receiving notches are equidistant from the center. A pair of receiving slots in the second edge of the hanger where the receiving slots are equidistant from the center and a receiving slot notch in both of the receiving slots.

In one aspect, the bottom of the adaptor includes a ramp extension and the ramp extension is connected with the tapered front of the adaptor and extends along the bottom of the adaptor.

In a further aspect, the hanger is precut from a single piece of material where the material is selected from a group consisting of: paper, plastic and metal.

According to another embodiment of the invention, a collapsible hanger and adapter combination apparatus consists of a single piece of material configured when folded to form a hanger including a top with an adapter receiving section and an object connection section connected with the top. The adapter receiving section is configured to receive an adapter configured for selective insertion and removal from the adapter receiving section. A means for removably connecting the top of the hanger with a surface and where the hanger is further comprised of a hanger with a length with a first edge and a second edge where the first edge and the second edge are separated by the width, the hanger with a first side and a second side and a center halfway along the length and between the width. A top fold in the hanger where the top fold includes a pair of top fold lines equidistant from the center with one top fold line on either side of the center. A limb fold in the hanger where the limb fold includes a pair of limb fold lines equidistant from the top fold lines such that each limb fold line is equidistant from the center and equidistant from one of the top fold lines. A connection tab in the hanger at one of the limb fold lines and a connection slot at the other limb fold line where the connection slot is conformed to receive the connection tab. A connection tab securing slot in the hanger where the connection tab securing slot is conformed to receive and retain the connection tab after the connection tab is received by the connection slot. An eyelet tab in the hanger where the eyelet tab is partially extendable from the hanger. A pair of first receiving notches in the first edge of the hanger where the first receiving notches are equidistant from the center. A pair of second receiving notches in the second edge of the hanger where the second receiving notches are equidistant from the center. A pair of receiving slots in the second edge of the hanger where the receiving slots are equidistant from the center and a receiving slot notch in both of the receiving slots.

In one aspect, the invention further includes an adapter where the adapter includes a tapered front and a top and a bottom and in another aspect, the invention further includes a means for removably connecting the top of the adapter with the hanger when the tapered front of the adapter is inserted into the adapter receiving section.

In one aspect, the means for removably connecting the top of the adapter with the hanger when the adapter is inserted into the adapter receiving section is selected from a group consisting of: metal, magnets and glue dots.

In another aspect, the invention further includes a wand connected to the adapter where the wand has a length with a first end and a second end where the first end is connected to the adapter and where the second end is a handle. In one aspect, the handle includes nested sections such that the handle is extendable and retractable.

In one aspect, the means for removably connecting the top of the hanger with a surface is selected from a group consisting of: magnets and glue dots.

In another aspect, the bottom of the adaptor includes a ramp extension where the ramp extension is connected with the tapered front of the adaptor and extends along the bottom of the adaptor.

According to another embodiment, a collapsible hanger and adapter combination method consists of:

a. providing a single piece of material configured when folded to form a hanger including a top with an adapter receiving section and an object connection section connected with the top; where the adapter receiving section is configured to receive an adapter configured for selective insertion and removal from the adapter receiving section; a means for removably connecting the top of the hanger with a surface; and where the hanger is further comprised of a hanger with a length with a first edge and a second edge where the first edge and the second edge are separated by the width, the hanger with a first side and a second side and a center halfway along the length and between the width. A top fold in the hanger where the top fold includes a pair of top fold lines equidistant from the center with one top fold line on either side of the center. A limb fold in the hanger where the limb fold includes a pair of limb fold lines equidistant from the top fold lines such that each limb fold line is equidistant from the center and equidistant from one of the top fold lines. A connection tab in the hanger at one of the limb fold lines and a connection slot at the other limb fold line where the connection slot is conformed to receive the connection tab. A connection tab securing slot in the hanger where the connection tab securing slot is conformed to receive and retain the connection tab after the connection tab is received by the connection slot. An eyelet tab in the hanger where the eyelet tab is partially extendable from the hanger. A pair of first receiving notches in the first edge of the hanger where the first receiving notches are equidistant from the center. A pair of second receiving notches in the second edge of the hanger where the second receiving notches are equidistant from the center. A pair of receiving slots in the second edge of the hanger where the receiving slots are equidistant from the center and a receiving slot notch in both of the receiving slots; and b. folding the hanger and connecting the connection tab so as to form a hanger apparatus.

In another aspect, the method further includes the step of attaching an object attachment device to the hanger apparatus. In another aspect, the method further includes the step of attaching an object to the object attachment device and connecting the hanger apparatus to a surface.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
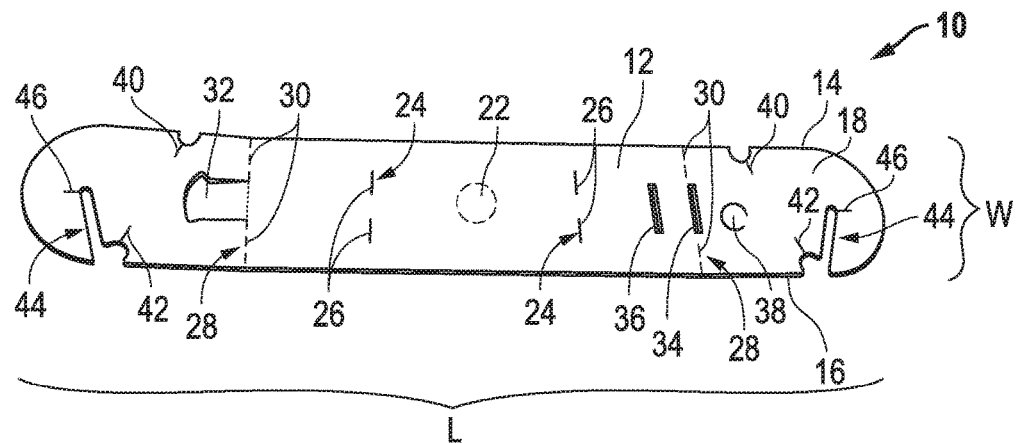
FIG. 1 is a top view of the improved hanger of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

A preferred embodiment of the present invention is illustrated by way of example in FIGS. 1-10. With specific reference to FIG. 1, the collapsible hanger and adapter combination 10 according to one embodiment includes a hanger 12. Preferably hanger 12 is formed from a single flat piece of material as shown. The material may be any useful material now known or hereafter developed that is foldable, as illustrated and described herein. Thus hanger 12 may be made of paper, plastic or metal, for example only and not by way of limitation. Hanger 12 has a length, "L" with a first edge 14 and a second edge 16 where the first edge 14 and the second edge 16 are separated by the width "W". The hanger 12 has a first side 18 and a second side 20 and a center 22 halfway along the length "L" and between the width "W" as shown. A top fold 24 is provided in the hanger 12 where the top fold 24 includes a pair of top fold lines 26 equidistant from the center 22 with one top fold line 26 on either side of the center 22 as shown. A limb fold 28 in the hanger 12 is provided where the limb fold 28 includes a pair of limb fold lines 30 equidistant from the top fold lines 24 such that each limb fold line 30 is equidistant from the center 22 and equidistant from one of the top fold lines 26 as shown.

Figure 3:
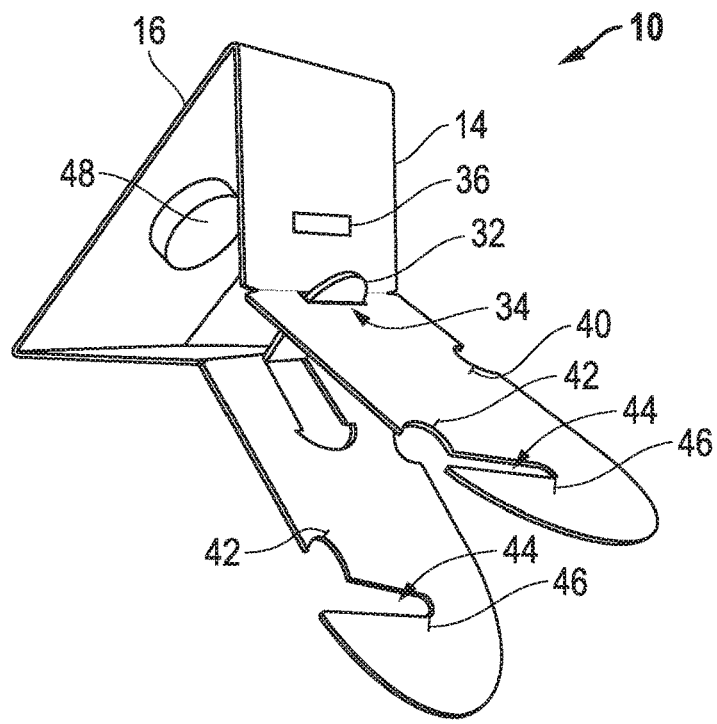
FIG. 3 is a perspective view of the invention of FIG. 1 with the connection tab in the connection slot.

A connection tab 32 is provided in the hanger 12 at one of the limb fold lines 30 and a connection slot 34 at the other limb fold line 30 as shown where the connection slot 34 is conformed to receive the connection tab 32 as more clearly shown in FIG. 3. A connection tab securing slot 36 is provided in the hanger 12 where the connection tab securing slot 36 is conformed to receive and retain the connection tab 32 after the connection tab 32 is received by, passes through, the connection slot 34.

Figure 4:
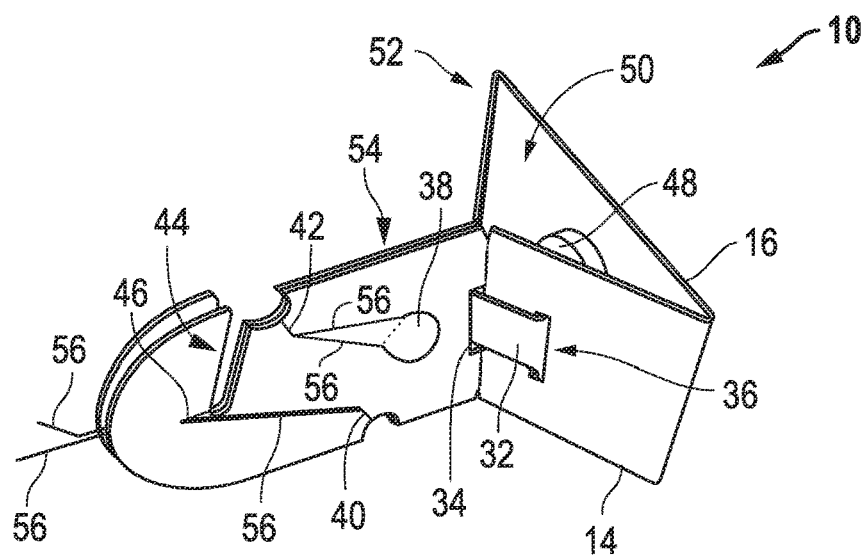
FIG. 4 is a perspective view of the invention of FIG. 1 showing the connection tab in the connection tab securing slot.
Figure 5:
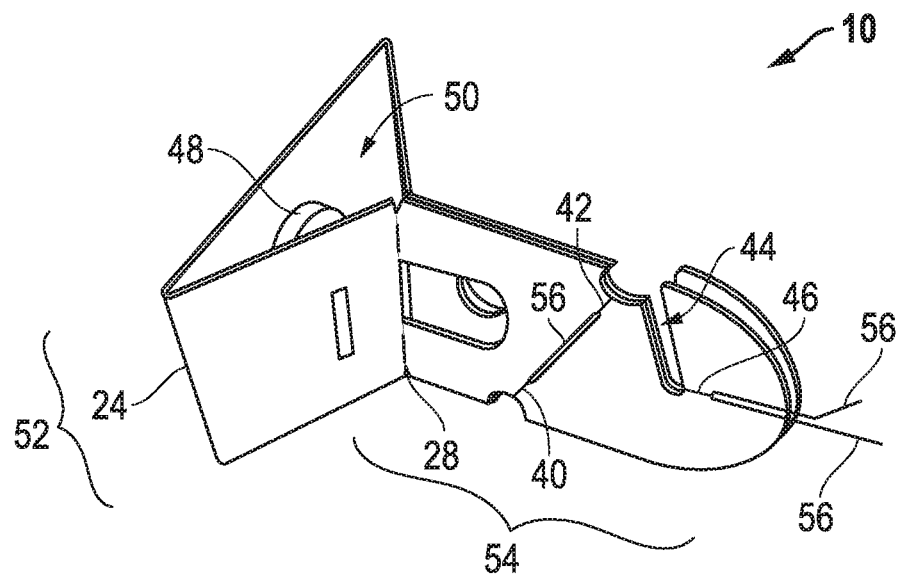
FIG. 5 is a perspective view further illustrating the attachment of hanging string to the hanger.

An eyelet tab 38 is provided in the hanger 12 where the eyelet tab 38 is partially extendable from the hanger 12 as more clearly shown in FIG. 4. A pair of first receiving notches 40 in the first edge 14 of the hanger 12 are provided where the first receiving notches 40 are equidistant from the center 22 as shown. A pair of second receiving notches 42 are provided in the second edge 16 of the hanger 12 where the second receiving notches 42 are equidistant from the center 22 also as shown. A pair of receiving slots 44 are provided in the second edge 16 of the hanger 12 where the receiving slots 44 are equidistant from the center 22 and a receiving slot notch 46 in both of the receiving slots 44 as illustrated.

Figure 2:
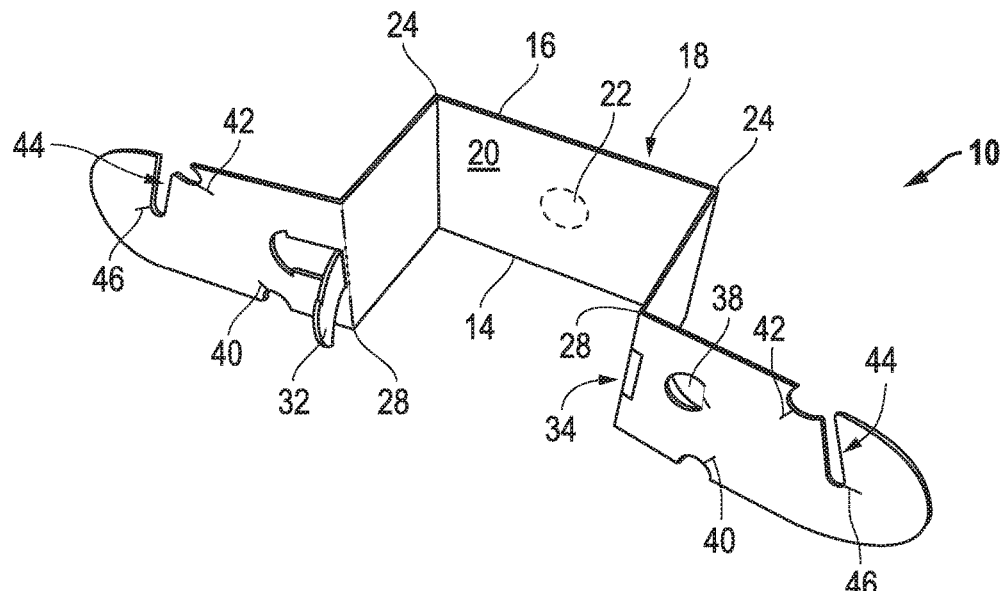
FIG. 2 is a perspective view of the invention of FIG. 1 with bends made at the fold lines.

The process for assembly of the collapsible hanger 10 from a single flat piece of material is illustrated by way of reference to FIGS. 2-5. FIG. 2 shows hanger 12 folded along both top fold lines 24 and limb fold lines 28. Connection tab 32 is released or exposed by the folding and ready for insertion into connection slot 34. FIG. 3 shows connection tab 32 partially inserted and passed partially through connection slot 34. FIG. 3 also illustrates a magnet 48 as a means for connecting the hanger 12 to a surface. Any suitable connection means such as a glue dot or hook and loop material is acceptable for the purposes of the invention.

FIG. 4 illustrates connection tab 32 passes completely through connection slot 34 and is then secured within connection tab securing slot 36. This essentially completes the creation of a hanger 12 from the flat single piece of material shown in FIG. 1. Upon assembly, the hanger 12 includes an adapter receiving section 50 at the top 52 and an object connection section 54 connected with the top 52 and integral with the adapter receiving section 50.

Figure 10:
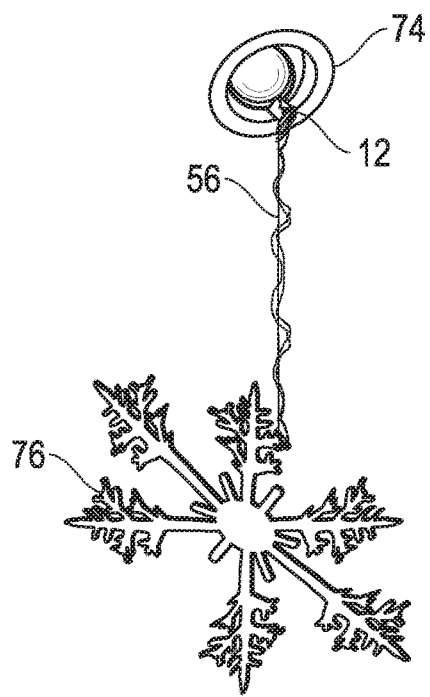
FIG. 10 is a perspective view of an object hanging from the hanger as placed on a ceiling as shown in FIG. 9.

In use, an object attachment device 56, such as string, monofilament line, thread, or the like, is connected with the assembled hanger. Starting with FIG. 4, a loop of line is slipped over eyelet tab 38. The line, now doubled, is inserted into second receiving notches 42 (importantly, because all the notches described herein are equidistant from the center 22, when the two halves are joined together, they align perfectly to form a single notch, as illustrated.) The doubled string is then wrapped around to the other side and inserted into first receiving notches 40. From there the object attachment device 56, string, is slipped into receiving slots 44 and then into receiving slot notches 46. FIG. 4 shows the string passing between the two limbs of the object connection section 54 and the short end of the string may be wrapped around and passed through the receiving slots 44 and back into receiving slot notches 46 to secure it in place while the longer section of the string extends from the hanger for use in attaching an object to be displayed as will be more fully described hereafter and as shown in FIG. 10. This process is further illustrated by reference to FIG. 5 which shows the opposite side of the limbs and illustrates the passage of the string in the course of the attachment process.

In sum, this configuration prevents the object attachment device 56 (string, etc.) from slipping out of the hanger 12. By loosening the string from the notches and pulling on one string or the other, the proper adjustment of the length of the string suspending an object can easily be made to vary the distances from the floor. Importantly and uniquely no knots are required to secure the object attachment device 56 to the hanger.

Figure 6:
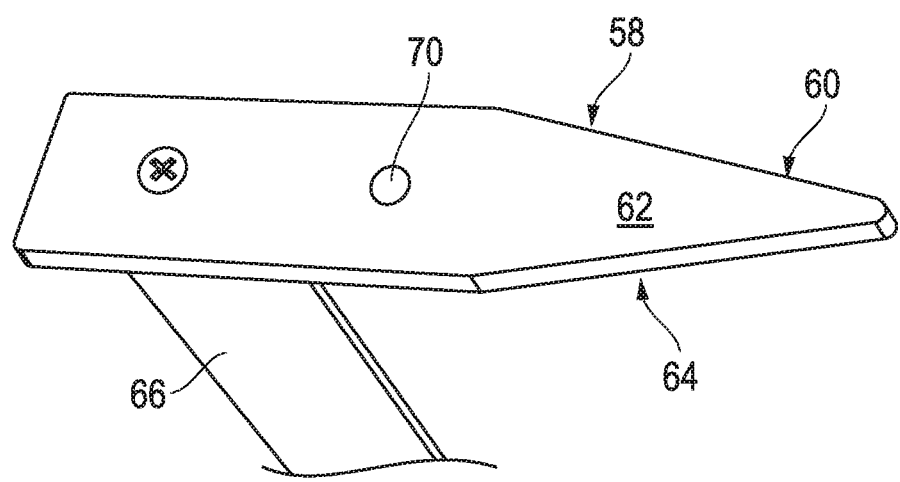
FIG. 6 is a perspective view of the adapter of the present invention.

Referring now to FIG. 6, adapter 58 is shown. When present, adapter 58 includes a tapered front 60 and a top 62 and a bottom 64 as shown. Adapter 58 by way of the tapered front 60 is configured to slip into the adapter receiving section 50 of hanger 12 as shown in FIG. 7.

Figure 7:
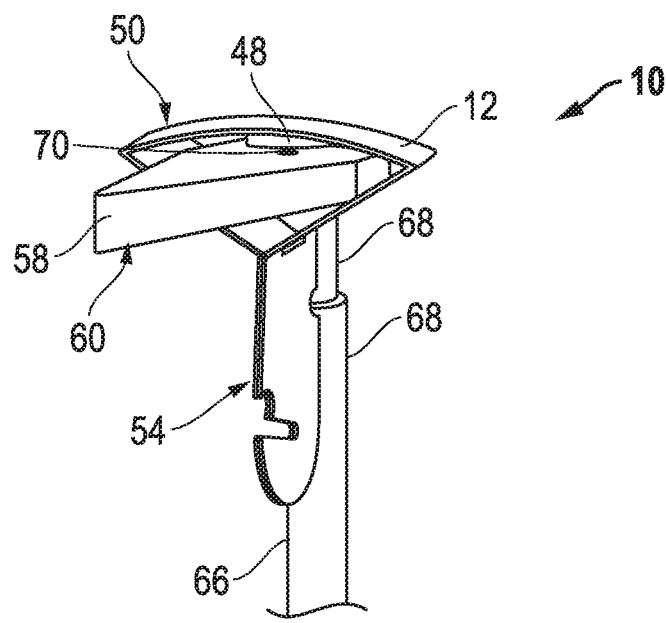
FIG. 7 illustrates the adapter connected with the invention of FIG. 1.

Preferably a wand or handle 66 is attached to adapter 58 and, again preferably, handle 66 includes multiple nested sections 68 such that sections may be extended and collapsed so as to accommodate a variety of ceiling heights as more clearly shown in FIG. 7.

FIG. 6 also shows a means for connecting the top 62 of adapter 58 to the top 52 of adapter receiving section 50. In a preferred embodiment connection means 70 is a metal device, like a nail head. Connection means 70 is attracted to and held in position by magnet 48 and thus prevents hanger 12 from slipping off of adapter 58 as the hanger is raised to the ceiling.

Figure 8:
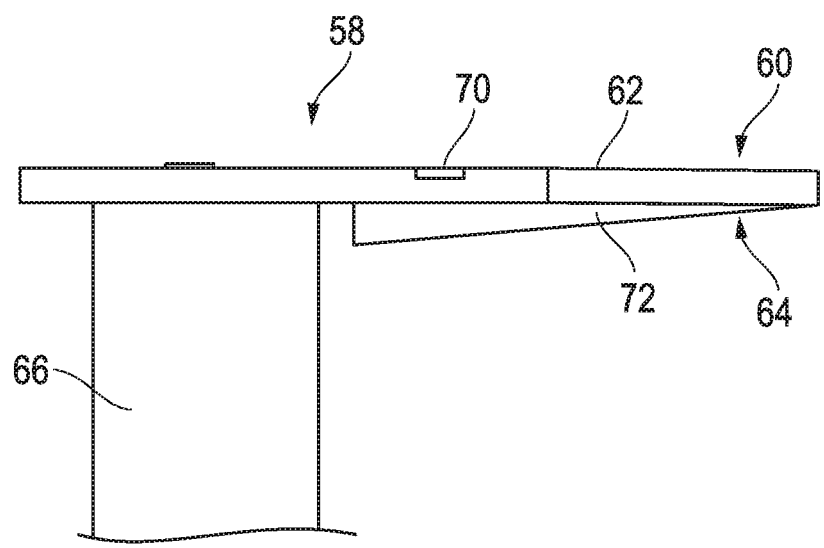
FIG. 8 is a side view of the adapter of the invention.

Referring to FIG. 8, another aspect of the invention includes a ramp 72 Ramp 72 is connected to the tapered front 60 on the bottom 64 of adapter 58 as shown. Ramp 72 is also tapered in that the ramp is shallow at the tapered front 60 and expands or gets larger in dimension along its length as shown. Applicant has found that the ramp 72 helps center adapter 58 within adapter receiving section 50 of hanger 12 and aides in the attachment and removal of the invention.

Figure 9:
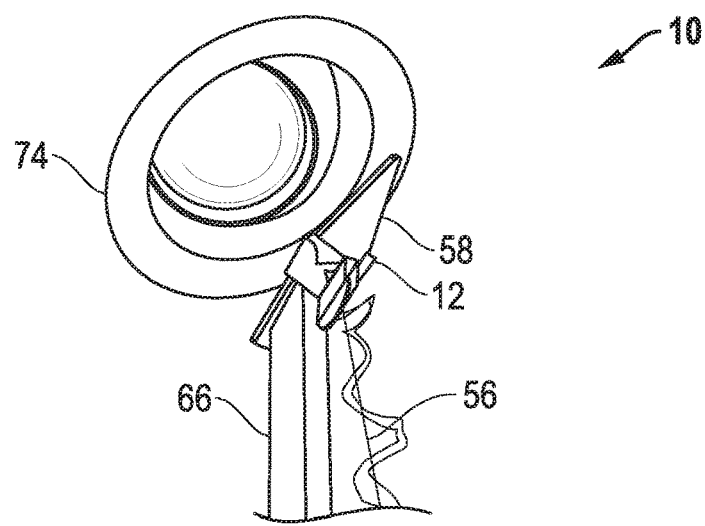
FIG. 9 is a perspective view of the adapter placing the hanger on a ceiling light fixture.

FIG. 9 shows the use of the adapter 58 to position hanger 12 on a light fixture 74. Certainly, it should be obvious, that the adapter may or may not be present although it is preferred. If the light fixture is metal, then hanger 12 is attached to it using magnet 48. If magnets are not suitable, then glue dots or other attaching devices may be substituted without deviating from the structure of the invention.

FIG. 10 shows object 76, a snowflake decoration, attached to object attachment device 56, line or string, on one end and the other end of the string attached as described above to hanger assembly 12.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A collapsible hanger and adapter combination apparatus comprising:
   a. a single piece of material configured when folded to form a hanger including a top with an adapter receiving section and an object connection section connected with said top;
   b. an adapter configured for selective insertion and removal from said adapter receiving section wherein said adapter includes a tapered front and a top and a bottom;
   c. a means for removably connecting said top of said hanger with a surface;
   d. a means for removably connecting said top of said adapter with said hanger when said tapered front of said adapter is inserted into said adapter receiving section; and
   e. a wand connected to said adapter wherein said wand has a length with a first end and a second end wherein said first end is connected to said adapter and wherein said second end is a handle wherein said handle includes nested sections such that said handle is extendable and retractable.

2. The apparatus of claim 1 wherein said means for removably connecting said top of said hanger with a surface is selected from a group consisting of: magnets and glue dots.

3. The apparatus of claim 2 wherein said means for removably connecting said top of said adapter with said hanger when said adapter is inserted into said adapter receiving section is selected from a group consisting of: metal, magnets and glue dots.

4. The apparatus of claim 1 wherein said object connection section includes more than one cutout for retaining object hanging material.

5. The apparatus of claim 1 wherein said hanger further comprises:
   a. a hanger with a length with a first edge and a second edge wherein said first edge and said second edge are separated by said width, said hanger with a first side and a second side and a center halfway along the length and between the width;
   b. a top fold in said hanger wherein said top fold includes a pair of top fold lines equidistant from said center with one top fold line on either side of said center;
   c. a limb fold in said hanger wherein said limb fold includes a pair of limb fold lines equidistant from said top fold lines such that each limb fold line is equidistant from said center and equidistant from one of the top fold lines;
   d. a connection tab in said hanger at one of said limb fold lines and a connection slot at the other limb fold line wherein said connection slot is conformed to receive said connection tab;
   e. a connection tab securing slot in said hanger wherein said connection tab securing slot is conformed to receive and retain said connection tab after said connection tab is received by said connection slot;
   f. an eyelet tab in said hanger wherein said eyelet tab is partially extendable from said hanger;
   g. a pair of first receiving notches in said first edge of said hanger wherein said first receiving notches are equidistant from said center;
   h. a pair of second receiving notches in said first edge of said hanger wherein said second receiving notches are equidistant from said center;
   i. a pair of receiving slots in said second edge of said hanger wherein said receiving slots are equidistant from said center; and
   j. a receiving slot notch in both of said receiving slots.

6. The apparatus of claim 1 wherein said bottom of said adaptor includes a ramp extension said ramp extension is connected with the tapered front of said adaptor and extends along the bottom of said adaptor.

7. The apparatus of claim 1 wherein said hanger is precut from a single piece of material wherein said material is selected from a group consisting of: paper, plastic and metal.

8. A collapsible hanger and adapter combination apparatus comprising:
   a. a single piece of material configured when folded to form a hanger including a top with an adapter receiving section and an object connection section connected with said top;
   b. wherein said adapter receiving section is configured to receive an adapter configured for selective insertion and removal from said adapter receiving section;
   c. a means for removably connecting said top of said hanger with a surface; and
   d. wherein said hanger is further comprised of a length with a first edge and a second edge wherein said first edge and said second edge are separated by a width, said hanger with a first side and a second side and a center halfway along the length and between the width;
   e. a top fold in said hanger wherein said top fold includes a pair of top fold lines equidistant from said center with one top fold line on either side of said center;

f. a limb fold in said hanger wherein said limb fold includes a pair of limb fold lines equidistant from said top fold lines such that each limb fold line is equidistant from said center and equidistant from one of the top fold lines;

g. a connection tab in said hanger at one of said limb fold lines and a connection slot at the other limb fold line wherein said connection slot is conformed to receive said connection tab;

h. a connection tab securing slot in said hanger wherein said connection tab securing slot is conformed to receive and retain said connection tab after said connection tab is received by said connection slot;

i. an eyelet tab in said hanger wherein said eyelet tab is partially extendable from said hanger;

j. a pair of first receiving notches in said first edge of said hanger wherein said first receiving notches are equidistant from said center;

k. a pair of second receiving notches in said first edge of said hanger wherein said second receiving notches are equidistant from said center;

l. a pair of receiving slots in said second edge of said hanger wherein said receiving slots are equidistant from said center; and m. a receiving slot notch in both of said receiving slots.

9. The apparatus of claim 8 further including an adapter wherein said adapter includes a tapered front and a top and a bottom.

10. The apparatus of claim 9 further including a means for removably connecting said top of said adapter with said hanger when said tapered front of said adapter is inserted into said adapter receiving section.

11. The apparatus of claim 10 wherein said means for removably connecting said top of said adapter with said hanger when said adapter is inserted into said adapter receiving section is selected from a group consisting of: metal, magnets and glue dots.

12. The apparatus of claim 9 further including a wand connected to said adapter wherein said wand has a length with a first end and a second end wherein said first end is connected to said adapter and wherein said second end is a handle.

13. The apparatus of claim 12 wherein said handle includes nested sections such that said handle is extendable and retractable.

14. The apparatus of claim 8 wherein said means for removably connecting said top of said hanger with a surface is selected from a group consisting of: magnets and glue dots.

15. The apparatus of claim 9 wherein said bottom of said adaptor includes a ramp extension wherein said ramp extension is connected with the tapered front of said adaptor and extends along said bottom of said adaptor.

16. A collapsible hanger and adapter combination apparatus comprising:

a. a single piece of material configured when folded to form a hanger including a top with an adapter receiving section and an object connection section connected with said top;

b. an adapter configured for selective insertion and removal from said adapter receiving section wherein said adapter includes a tapered front and a top and a bottom;

c. a means for removably connecting said top of said hanger with a surface wherein said means for removably connecting said top of said hanger with a surface is selected from a group consisting of: magnets and glue dots; and d. a means for removably connecting said top of said adapter with said hanger when said tapered front of said adapter is inserted into said adapter receiving section.

17. The apparatus of claim 16 further including a wand connected to said adapter wherein said wand has a length with a first end and a second end wherein said first end is connected to said adapter and wherein said second end is a handle.

18. The apparatus of claim 17 wherein said handle includes nested sections such that said handle is extendable and retractable.

19. The apparatus of claim 16 wherein said means for removably connecting said top of said adapter with said hanger when said adapter is inserted into said adapter receiving section is selected from a group consisting of: metal, magnets and glue dots.

20. The apparatus of claim 16 wherein said object connection section includes more than one cutout for retaining object hanging material.

* * * * *